US00RE35832E

United States Patent [19]

Perkins

[11] E Patent Number: Re. 35,832

[45] Reissued Date of Patent: Jun. 30, 1998

[54] ELECTROSTATICALLY PROTECTED IC CARD

[75] Inventor: Carl C. Perkins, Irvine, Calif.

[73] Assignee: ITT Corporation, New York, N.Y.

[21] Appl. No.: 558,285

[22] Filed: Nov. 13, 1995

Related U.S. Patent Documents

Reissue of:

[64] Patent No.: 5,319,516
Issued: Jun. 7, 1994
Appl. No.: 84,034
Filed: Jun. 28, 1993

U.S. Applications:

[63] Continuation of Ser. No. 756,940, Sep. 9, 1991, abandoned.

[51] Int. Cl.[6] ..... H05F 3/00; H05K 5/04

[52] U.S. Cl. ..... 361/220; 361/730

[58] Field of Search ..... 235/492, 495; 257/668, 710, 728, 729, 678, 679, 699, 708; 439/86, 87, 88, 89, 90, 91, 95; 174/35 R; 361/212, 220, 728, 730, 736, 737, 752, 753, 816, 818

[56] References Cited

U.S. PATENT DOCUMENTS

| | | | |
|---|---|---|---|
| 2,995,686 | 8/1961 | Selvin | 317/101 |
| 3,200,361 | 8/1965 | Schwartz et al. | 339/17 |
| 3,372,310 | 3/1968 | Kantor | 317/101 |
| 4,146,291 | 3/1979 | Goff et al. | 339/111 |
| 4,179,178 | 12/1979 | Bachman et al. | 339/111 |
| 4,381,129 | 4/1983 | Krenz | 339/14 |
| 4,384,368 | 5/1983 | Rosenfeldt et al. | 445/602 |
| 4,386,814 | 6/1983 | Asick | 339/14 |
| 4,388,671 | 6/1983 | Hall et al. | 361/383 |
| 4,399,487 | 8/1983 | Neumann | 361/391 |
| 4,455,448 | 6/1984 | Bertolina | 174/35 |
| 4,457,575 | 7/1984 | Davis et al. | 339/143 |
| 4,479,263 | 10/1984 | Rosenfeldt et al. | 455/602 |
| 4,491,981 | 1/1985 | Weller | 455/602 |
| 4,521,062 | 6/1985 | Kurbikoff et al. | 339/14 |
| 4,531,176 | 7/1985 | Beecher, II | 361/424 |
| 4,602,164 | 7/1986 | Gore, III et al. | 307/91 |
| 4,642,735 | 2/1987 | Hodsdon et al. | 361/424 |
| 4,661,889 | 4/1987 | Fushimoto | 361/424 |
| 4,739,453 | 4/1988 | Kurokawa | 361/424 |
| 4,780,570 | 10/1988 | Chuck | 174/35 |
| 4,780,791 | 10/1988 | Morita et al. | 361/395 |
| 4,821,146 | 4/1989 | Behrens et al. | 361/383 |
| 4,823,235 | 4/1989 | Suzuki et al. | 361/424 |
| 4,849,944 | 7/1989 | Matsushita | 371/21 |
| 4,868,716 | 9/1989 | Taylor et al. | 361/424 |
| 4,872,091 | 10/1989 | Maniwa et al. | 361/424 |
| 4,889,495 | 12/1989 | Kimura | 439/60 |

(List continued on next page.)

FOREIGN PATENT DOCUMENTS

| | | |
|---|---|---|
| 0417648 | 3/1991 | European Pat. Off. . |
| 63-14977 | 2/1988 | Japan . |
| 2239699 | 9/1990 | Japan . |

OTHER PUBLICATIONS

Elektronik OEM AK, vol. 37, No. 17, 19 Aug. 1988, Munchen p 42 'Speicher: viel leistung–wenig plaz' *whole document*.

Patent Abstracts of Japan, vol. 11, No. 147 (P–575) 14 May 1987 & JP–A–61 282 982 (Hitachi Maxell Ltd) *abstract*.

Patent Abstracts of Japan, vol. 16, No. 350 (M–1287) 28 Jul. 1992 & JP–A–41 07 191 (Fujitsu Ltd) 8 Apr. 1992 *abstract*.

*Primary Examiner*—Fritz Fleming
*Attorney, Agent, or Firm*—Freilich Hornbaker Rosen

[57] ABSTRACT

A system is provided wherein an IC memory card (10, FIG. 2) is inserted into a slot (12) of an electronic device (14), which discharges any static electric charge on the card. The card includes a frame that comprises a body having opposite side beams and top and bottom conductive covers mounted on the side beams, to enclose a circuit board. The circuit board has a ground plane, and a first of the side beams has an electrically conductive surface portion directly engaged with a peripheral portion of the ground plane and with one of the covers, to connect the cover to the side beam conductive portion. The body can be constructed of molded electrically conductive material.

10 Claims, 3 Drawing Sheets

U.S. PATENT DOCUMENTS

| | | | |
|---|---|---|---|
| 4,889,498 | 12/1989 | Mizuta | 439/86 |
| 4,893,001 | 1/1990 | Ohkubo et al. | 235/490 |
| 4,905,124 | 2/1990 | Banjo et al. | 361/395 |
| 4,945,633 | 8/1990 | Hakanen et al. | 29/825 |
| 4,955,817 | 9/1990 | Sugai | 439/60 |
| 4,967,315 | 10/1990 | Schelhorn | 361/424 |
| 4,980,856 | 12/1990 | Ueno | 364/900 |
| 5,014,160 | 5/1991 | McCoy, Jr. | 361/424 |
| 5,038,250 | 8/1991 | Uenaka et al. | 361/736 |
| 5,050,041 | 9/1991 | Shafi | 361/391 |
| 5,053,613 | 10/1991 | Onoda | 361/736 |
| 5,053,924 | 10/1991 | Kurgan | 361/424 |
| 5,107,404 | 4/1992 | Tam | 361/818 |
| 5,167,326 | 12/1992 | Murphy | 361/220 |
| 5,244,397 | 9/1993 | Anhalt | 361/730 |

FIG. 3
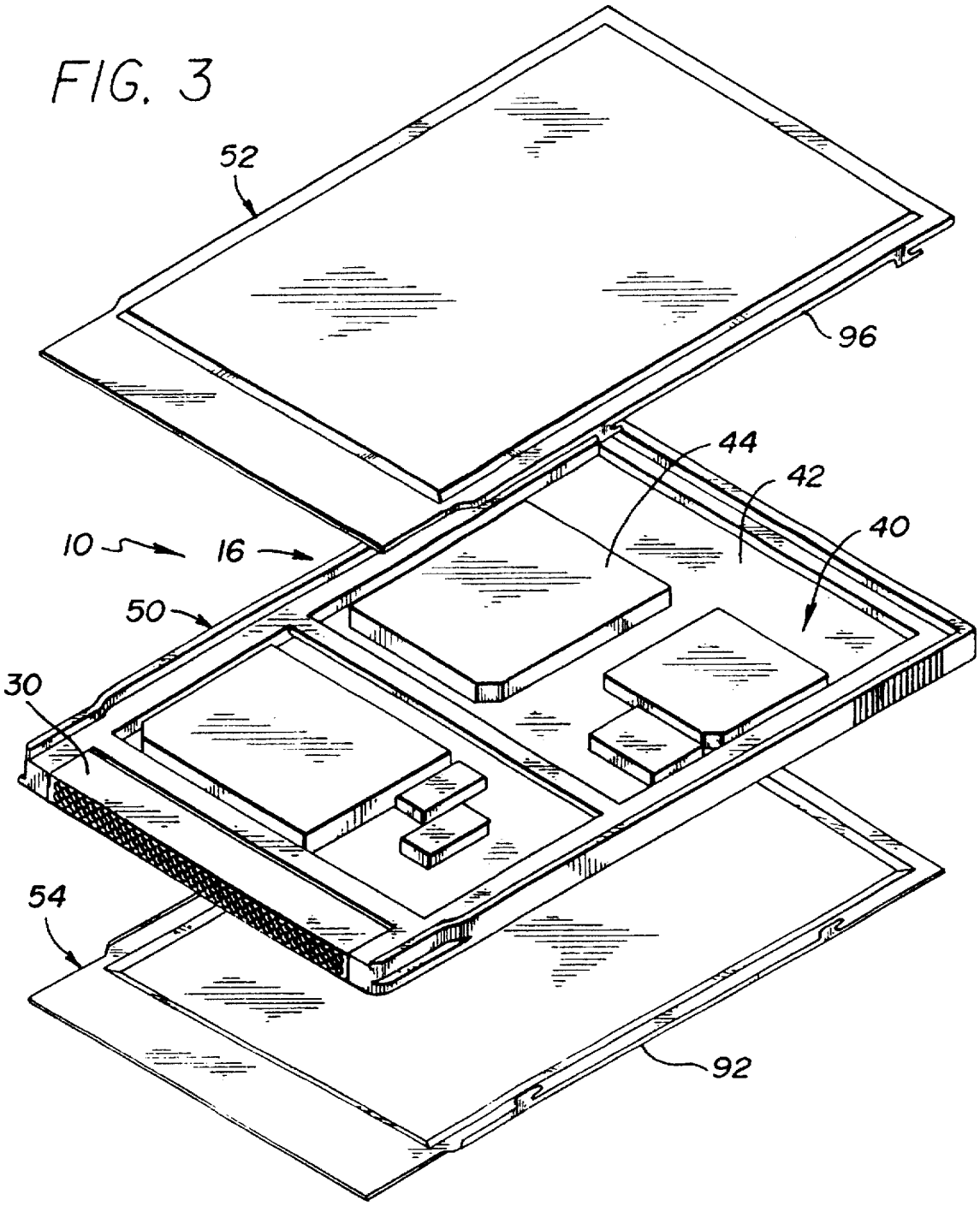
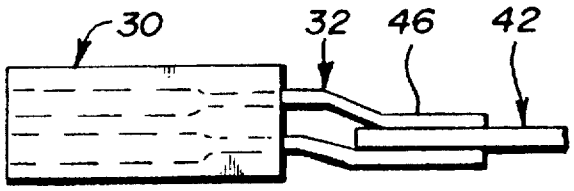
FIG. 6

ELECTROSTATICALLY PROTECTED IC CARD

Matter enclosed in heavy brackets [ ] appears in the original patent but forms no part of this reissue specification; matter printed in italics indicates the additions made by reissue.

This is a continuation of application Ser. No. 07/756,940, filed Sep. 9, 1991, now abandoned.

BACKGROUND OF THE INVENTION

Memory cards commonly are constructed with a molded plastic body having opposite sides and ends, a combination circuit board and connector that is installed in the body, and top and bottom metallic covers installed at the top and bottom of the body. Such memory cards are especially useful in electronic equipment or devices of very small thickness, such as laptop computers that may have a width and length of 8½ inches by 11 inches, and a thickness of much less than one inch. Standard JEIDA cards have a thickness, or height, of five *or* 3.3 [or] millimeters, which enables them to be inserted into thin slots of the electronic device.

SUMMARY OF THE INVENTION

In accordance with one embodiment of the present invention, an IC memory card is provided which enables grounding of the card during its insertion into a slot of an electronic device. The card has a frame that includes a molded body with opposite sides and forward and rearward ends, which holds a circuit board assembly having a ground plane and which hold a connector connected to the circuit board. The frame has an electrically conductive region connected to the ground plane of the circuit board.

The body of the card frame can be molded of electrically conductive material. The electrically conductive body provides good EMI (electromagnetic interference) shielding for the card (in conjunction with conductive top and bottom covers of the frame).

The novel features of the invention are set forth with particularly in the appended claims. The invention will be best understood from the following description when read in conjunction with the accompanying drawings.

BRIEF DESCRIPTION OF THE DRAWINGS

FIG. 3 is an exploded isometric view of the memory card of FIG. 2.

FIG. 6 is a side view of a combination of connector and circuit board assembly of the card of FIG. 3.

DESCRIPTION OF THE PREFERRED EMBODIMENTS

Figure 1:
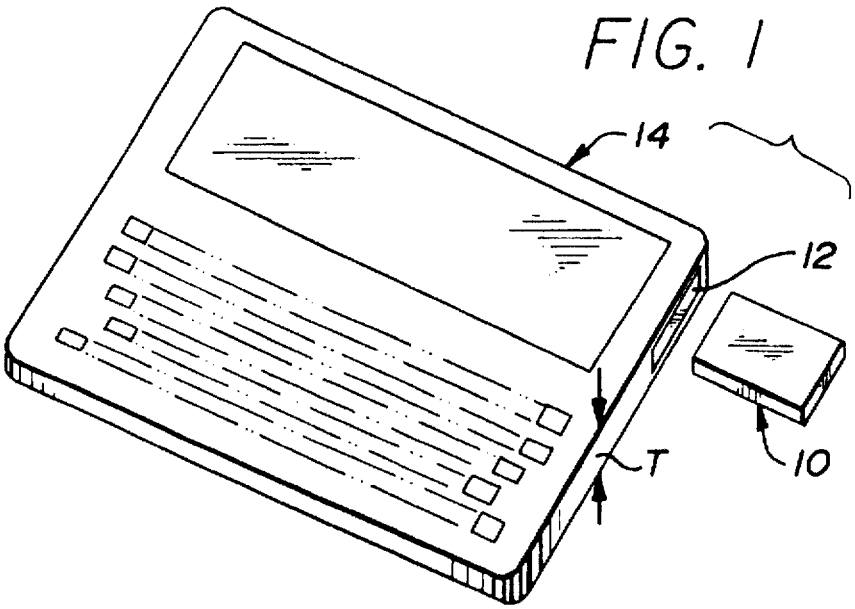
FIG. 1 is an isometric view of an IC memory card and an electronic device in the form of a laptop computer, constructed in accordance with the present invention.

FIG. 1 illustrates an IC (integrated circuit) memory card 10 of the present invention that is adapted to be inserted into a slot 12 of an electronic device 14, the particular device shown being a laptop computer. One style of electronic computer has a width and length of 8.5 inches and 11 inches respectively and a thickness T that is as small as possible, preferably a small fraction of an inch. Such as laptop computer can be carried around in space designed to be occupied by ordinary sheets of paper or booklets. One source of concern in using memory cards, is that the card may have a considerable static electric charge, which must be dissipated prior to full insertion of the card, to avoid damage to components in the electronic device.

Figure 2:
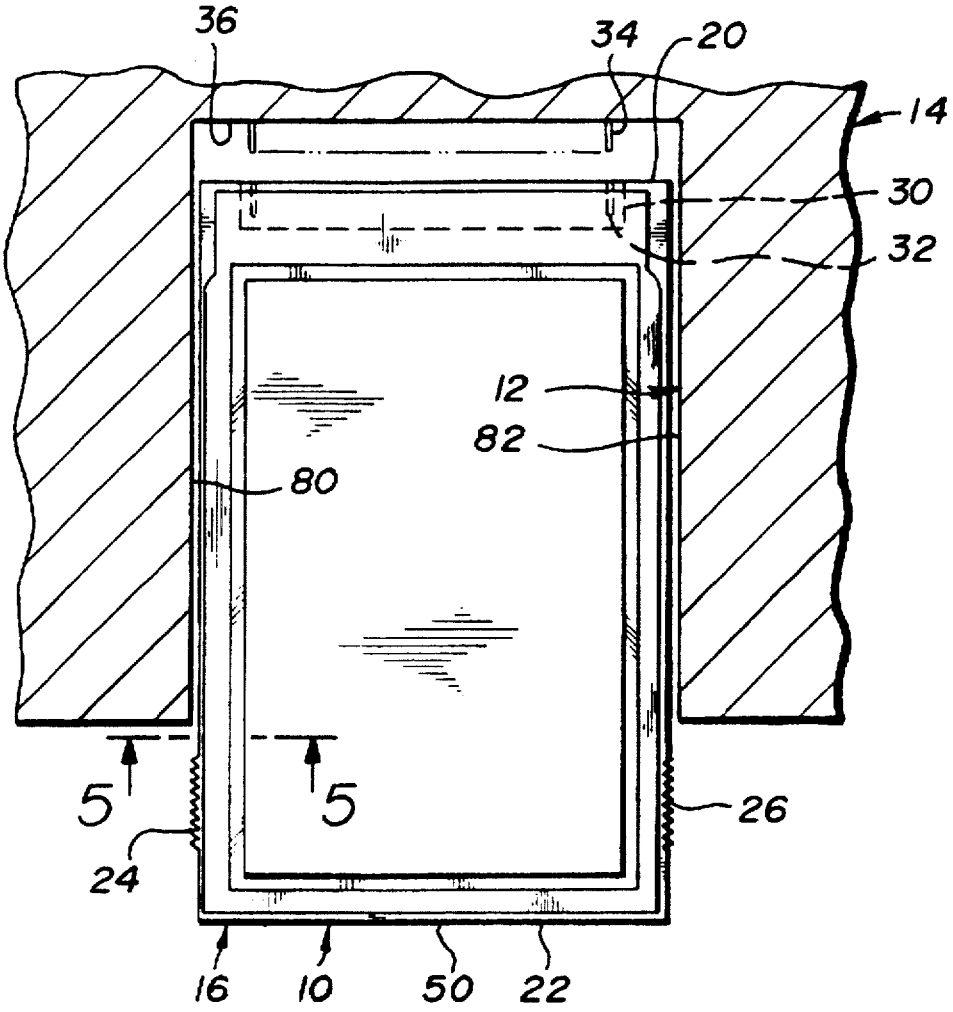
FIG. 2 is a sectional top view of the memory card and a portion of the electronic device of FIG. 1.

FIG. 2 shows the memory card 10 as it is being inserted into the slot 12 of the device 14. The memory card includes a frame 16 with forward and rearward ends 20, 22 and opposite sides 24, 26. A connector 30 is mounted at the forward end of the frame and has multiple socket contacts 32 that are positioned to mate when the card moves in a forward direction. The electronic device has multiple corresponding pin contacts 34 at the front end 36 of the slot, which fully engage the socket contacts when the card is fully in a forward direction inserted into the slot. The connector 30 has a housing molded of dielectric material with holes that hold the card contacts 32.

FIG. 3 shows details of the memory card 10, which includes the frame 16 and connector 30 that is mounted at the forward end of the frame. A circuit board assembly 40 that is mounted on the frame, includes a circuit board 42 and a plurality of circuit components 44 mounted on the board. FIG. 6 illustrates how the rear ends 46 of the connector socket contacts 32 are connected to conductive traces on the board 42. The frame 16 (FIG. 3) includes an injection molded body 50 and upper and lower electrically conductive covers 52, 54 that can be mounted on the top and bottom of the frame body 50. The card is assembled by first installing the combination circuit board assembly 40 and connector 30 on the body 50. Then the upper and lower covers 52, 54 are attached to opposite faces of the body.

Figure 4:
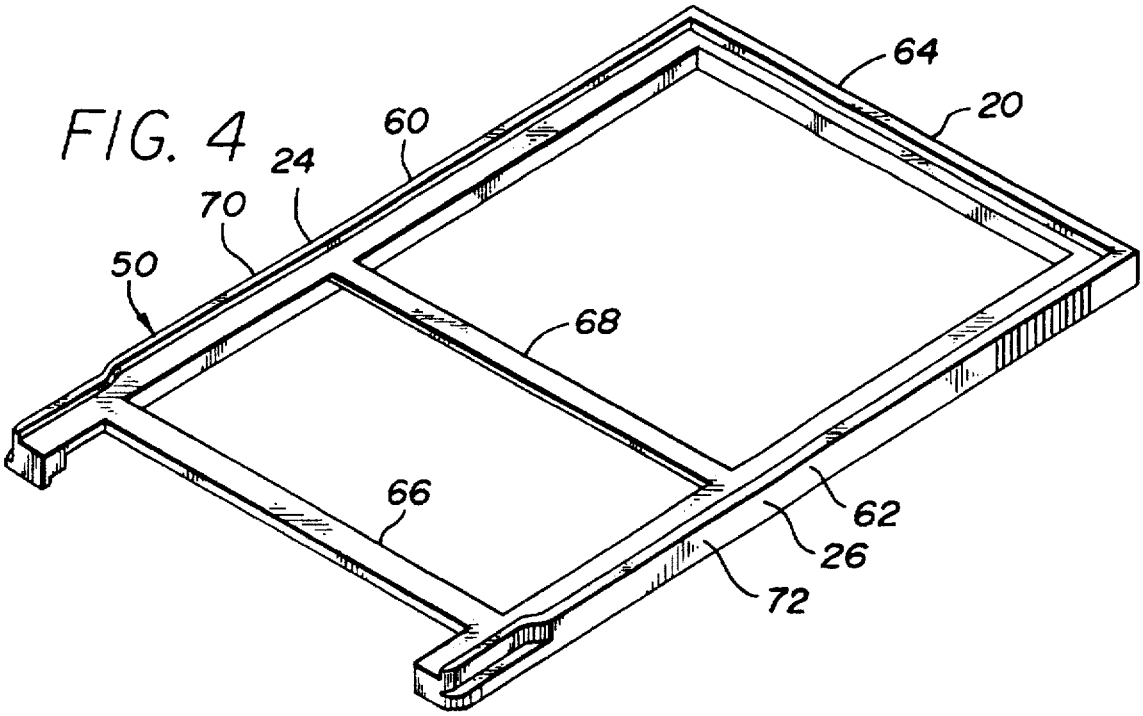
FIG. 4 is an isometric view of just the body of the frame of the memory card of FIG. 3.

FIG. 4 illustrate details of the molded body 50. The body includes a pair of side beams 60, 62 forming the opposite sides or side edges 24, 26 of the card, *with the side edges 24, 26 forming the outside of the side beams 60, 62,* and a rear beam 64 forming the rear end 22 of the card. The body also includes a pair of cross beams 66, 68 which strengthen the body. *Each vertical crossbeam 66, 68 has a vertical thickness that is much less than that of the side beams 60, 62.*

In accordance with the present invention, the injection molded body 50 is formed of injection molded plastic material which is electrically conductive. A variety of plastic conductive materials are known, which often include multiple particles or fibers of conductive material, such as silver, embedded in a dielectric plastic material, such as a polyester. Such material can be referred to as a molded electrically conductive primarily polymeric material. Although the electrical resistivity of molded plastic material is much higher than that of some metals such as silver and copper, often having a bulk resistivity that is about one or two orders of magnitude greater than that of copper[. The dielectric material of the connector 30 (FIG. 2) therefore has a resistivity more than 4 orders of magnitude greater than that of copper (Whose] *whose* electrical resistivity is 1.7 microhm-centimeter [the]. *The* resistivity of such conductive plastic materials is moderate and they are considered to be electrically conductive (their resistivities are less than four orders of magnitude greater than that of copper). *The dielectric material of the connector 30 (FIG. 2) therefore has a resistivity more than 4 orders of magnitude greater than that of copper.* The use of an electrically conductive body results in important advantages for the memory card. One advantage is that the conductive side and rear beams provide protection against EMI (electromagnetic interference) that might otherwise pass between the metal upper and lower covers [50] *52*, 54 of the frame. The circuitry in highly compact electronic devices such as laptop computers is typically very close together and it is important to minimize electromagnetic interference between components in the card and those in the electronic device. *The sides 24, 26 of the electrically conductive body have electrically conductive surface regions, or portions 70, 72.*

Figure 5:
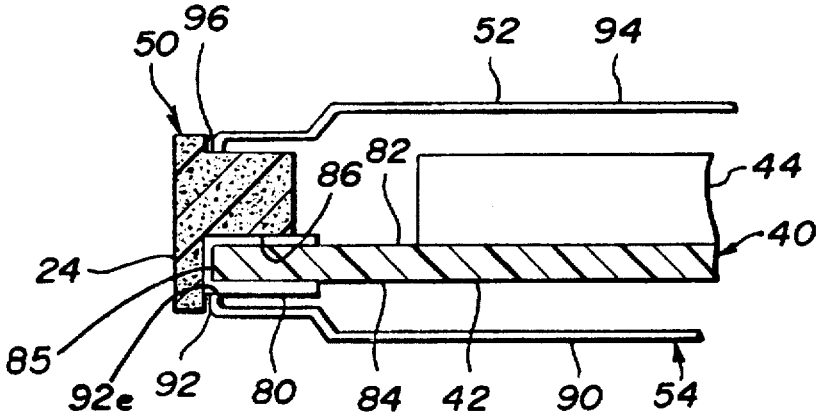
FIG. 5 is a partial sectional view of a memory card taken on the line 5—5 of FIG. 2.

FIG. 5 illustrates some details of the connection of the circuit board assembly 40 and the electrically conductive body 50 of the frame. The circuit board 42 of the assembly includes a ground plane 80 of electrically conductive material such as foil, which is connected to grounded locations on the electronic components on the board. The ground plane lies on the opposite faces 82, 84 of the board adjacent to the edges 85 of the board. When the card is assembled as shown in FIG. 5, the ground plane 80 lies facewise against a surface 86 of the frame body 50, to ground the body 50. The bottom cover 54 has a horizontally-extending face 90 and has an edge portion 92 that is bent to extend largely vertically and that has an extreme edge 92e. The edge of the edge portion bears against the ground plane at 80, to assure that the lower cover 54 is maintained at the same potential as the ground plane of the circuit board and the conductive body 50. The top cover 52 also has a face 94 and a bent edge portion 96 whose edge contacts the conductive body to keep the upper cover grounded. This construction avoids the need to use springs or the like to connect the top and bottom covers to each other and to the ground plane, as is used in U.S. Pat. No. 4,780,791. The card can include a frame with a body having portions lying along opposite sides and the rear end of the card, with the body formed of electrically conductive material. Forming the body of electrically conductive material has the additional advantage of providing EMI (electromagnetic interference) shielding along most of the edge area of the card.

*It is apparent from the drawings and from the fact that edge portions 92, 96 of the covers are bent, that the electrically conductive covers are formed of sheet metal, that is, of metal having a uniform thickness as opposed to a block of metal that has been machined to cut away metal so as to form depressions and projections.*

Although particular embodiments of the invention have been described and illustrated herein, it is recognized that modifications and variations may readily occur to those skilled in the art, and consequently, it is intended that the claims be interpreted to cover such modifications and equivalents.

I claim:

1. An IC card which includes a frame having opposite sides, forward and rearward ends, and top and bottom *electrically conductive* cover regions, said card including a circuit board assembly which lies in said frame and which includes a circuit board having a ground plane and at least one circuit component mounted in said circuit board, said card being constructed to be inserted into a slot of an electronic device until card contacts at the front end of the card mate with device contacts in the device, characterized by:

at least said opposite sides of said frame are formed of molded electrically conductive plastic material having an electrical resistivity which is a plurality of times greater than that of copper, and said opposite sides of said frame are electrically connected to said ground plane of said circuit board.

2. The IC card described in claim 1 wherein:

said frame includes a connector lying at said forward end of said frame and comprising a housing constructed of molded dielectric material having a resistivity more than four orders [fo] *of* magnitude greater than the resistivity of copper, said housing having a plurality of holes which hold said card contacts.

3. The IC card described in claim 1 wherein:

said frame includes a molded body of said electrically conductive plastic material, said body having opposite side edges forming at least part of said frame sides, and said frame also includes top and bottom covers mounted over said body and forming said top and bottom cover regions;

said circuit board has opposite faces and opposite edges, with a first of said circuit board edges lying adjacent to a first of said body edges, and said ground plane of said circuit board includes a portion lying on one of said circuit board faces adjacent to said first board edge;

a first of said covers has a primarily horizontally-extending face and has an edge portion bent to extend largely vertically, said edge portion having an extreme edge bearing against said ground plane portion on said circuit board.

4. An IC card comprising:

a frame having opposite sides and front and rear ends and having top and bottom conductive cover regions;

a circuit board assembly which includes a board and at least one circuit component mounted on said board, said board having a ground plane;

a connector which is mounted on said front end of said frame and which has a plurality of contacts;

said frame including a body extending at least along said opposite sides, said body being constructed of molded electrically conductive primarily polymeric material molded into the shape of said body and connected to said ground plane of said board.

5. The card described in claim 4 wherein:

said molded electrically conductive primarily polymeric material has a bulk resistivity which is at least one order to magnitude greater than that of copper, but less than 4 orders of magnitude greater than that of copper.

[6. An IC card comprising:

a frame having opposite sides and front and rear ends and including a body having opposite body side beams;

said frame has first and second conductive covers that each has a peripheral cover portion, with one of said covers being a top cover that generally lies over said body and the other cover being a bottom cover that generally lies under said body;

a circuit board assembly mounted to said body side beams, said circuit board assembly including a board and at least one circuit component mounted on said board, said board assembly having a ground plane;

said board has a peripheral board portion, and said ground plane includes a peripheral ground plane lying at said board peripheral portion and electrically connected to both of said cover peripheral portions;

said body side beams each having an inner first portion sandwiched between said cover peripheral portions, said side beams each having an outer second portion which lies outside said board and said cover peripheral portions to protect the edges of said board and of said covers;

at least one of said body side beams having an electrically conductive surface portion directly engaged with said peripheral ground plane portion; and one of said covers having a vertically bent edge directly engaged with said side beam conductive surface portion.]

[7. The IC card described in claim 6 wherein:

said outer second portions of said body side beams each have inner surfaces where they merge with said inner first portions, and said vertically bent edge of said one cover lies substantially against the inner surface of said outer second portion of said one body side beam.]

[8. An IC card comprising:

a frame which includes a body having opposite sides and forming opposite side beams at said opposite sides, said body also having opposite forward and rearward ends with the distance between said opposite ends being greater than the distance between said opposite sides, said body having upper and lower surfaces, said frame including top and bottom conductive covers that lie respectively over said body upper and lower surfaces and that each has a peripheral cover portion;

a connector mounted on a first of said frame ends and having contacts positioned to mate when the card moves in a forward direction;

a circuit board assembly mounted to said frame, said circuit board assembly including a board with a peripheral portion mounted on said body side beams and with most of said board lying between said body side beams, said board having a ground plane with a peripheral ground plane portion lying at said board peripheral portion; and a first of said body beams having an electrically conductive surface portion directly engaged with said board ground plane peripheral portion and with a first of said covers, to electrically connect said board ground plane peripheral portion to said first of said covers.]

[9. An IC card comprising:

a frame having opposite sides and front and rear ends and including a body having opposite side beams, said body including upper and lower surfaces and top and bottom conductive covers that lie respectively over said body upper and lower surfaces and that each has a peripheral cover portion;

a circuit board assembly mounted to said frame, said circuit board including a board mounted on said body side beams, said board lying between said body side beams and having a peripheral board portion and at least one circuit component mounted on said board, said board having a ground plane with a peripheral ground plane portion lying at said board peripheral portion;

at least one of said body beams having an electrically conductive surface portion directly engaged with said peripheral ground plane portion; and a first of said covers has a primarily horizontally extending face and has an edge portion which is bent to extend vertically and directly engages said side beam conductive surface portion.]

10. The combination of components which when assembled, forms the frame of an IC card that is adapted to contain a circuit board assembly, said combination comprising:

a body for supporting the circuit board assembly of said IC card, said body having a top and bottom, opposite sides, and front and rear ends, with said ends spaced apart by a greater distance than said sides;

a pair of *electrically conductive sheet metal* covers for mounting respectively at said top and bottom of said body to enclose the circuit board assembly;

said body having spaced opposite side beams at said sides, with each of said side beams having upwardly and downwardly-facing surfaces;

at least a first of said body side beams has an electrically conductive surface portion, with parts of said conductive surface portion lying at the outside of said first side beam [at said body side], and at both said upwardly and downwardly-facing surfaces of said first side beam;

a first of said covers has a peripheral cover portion *with a periphery having a vertically-facing cover surface* that directly engages said electrically conductive surface portion *of said first side beam and that provides a direct electrical connection thereat between said first cover and said first side beam* when said covers are mounted on said body.

11. The combination described in claim 10 wherein:

first cover has a vertically bent edge which forms said peripheral cover portion that directly engages one of said parts of said electrically conductive surface portion when said covers are mounted on said body.

12. The combination described in claim 10 wherein:

said body is constructed of a molded electrically conductive polymeric material.

*13. The IC card described in claim 10 wherein:*

*said body includes a plurality of cross beams extending between said body side beams;*

*said cross beams each has a thickness less than that of said side beams.*

*14. The combination of components which when assembled, forms the frame of an IC card that is adapted to contain a circuit board assembly, said combination comprising:*

*a body for supporting the circuit board assembly of said IC card, said body having a top and a bottom, opposite sides, and front and rear ends that are spaced along a length direction, with said ends spaced apart by a greater distance than said sides;*

*a pair of electrically conductive sheet metal covers for mounting respectively at said top and bottom of said body to enclose the circuit board assembly;*

*said body having spaced opposite side beams at said sides, with each of said side beams having upwardly and downwardly-facing surfaces;*

*each of said body side beams has an electrically conductive surface portion, with parts of said conductive surface portion lying at the outside of each of said side beams at said body sides, and at both said upwardly and downwardly-facing surfaces of each of said side beams, with the conductive surface portion at the outside of each of said side beams extending along substantially the entire length of the side beam;*

*a first of said sheet metal covers has a cover periphery that directly engage said upwardly-facing surfaces of said side beams when said covers are mounted on said body, with said first sheet metal cover being electrically connected to said side beams only at said cover periphery.*

* * * * *